UNITED STATES PATENT OFFICE.

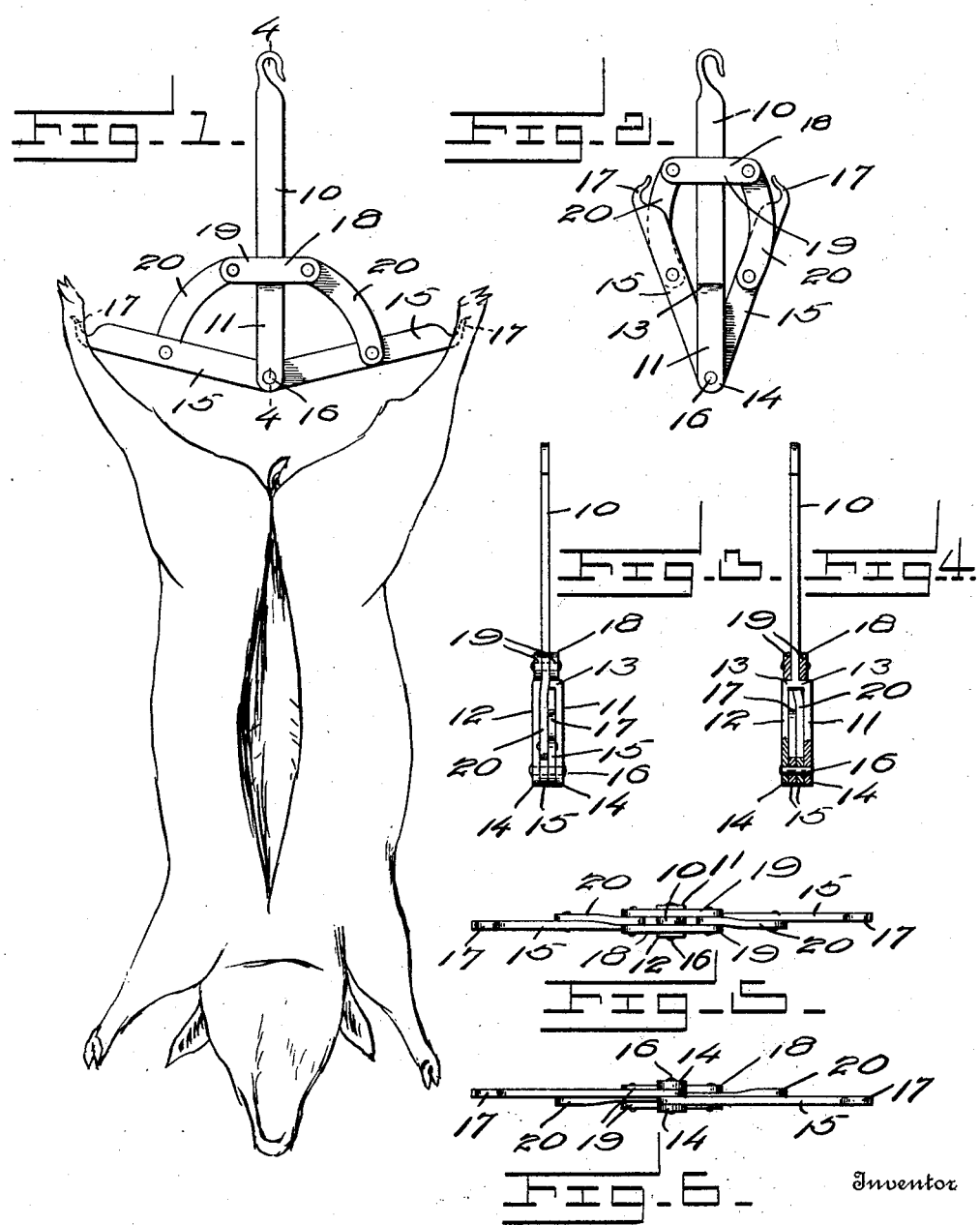

JASPER F. WILSON, OF BURR OAK, KANSAS.

GAMBREL.

1,033,223.  Specification of Letters Patent.  Patented July 23, 1912.

Application filed June 26, 1911. Serial No. 635,340.

*To all whom it may concern:*

Be it known that I, JASPER F. WILSON, a citizen of the United States, residing at Burr Oak, in the county of Jewell and State of Kansas, have invented certain new and useful Improvements in Gambrels, of which the following is a specification.

This invention relates to gambrels, and has for its object to provide a gambrel which will be so constructed that it will be easily engaged with the feet of an animal and which will be so arranged that the weight of the animal will induce movement of the gambrel arms to spread the legs and hold them securely.

Another object is to provide a structure in which the movement of the arms will be limited to prevent their passage beyond the pivot point.

Other objects and advantages will be apparent from the following description and it will be understood that changes in the specific structure shown and described may be made within the scope of the claims without departing from the spirit of the invention.

In the drawings: Figure 1 is an elevational view of the present gambrel in use. Fig. 2 is an elevational view showing the arms folded. Fig. 3 is an edge view. Fig. 4 is a longitudinal section on line 4—4 of Fig. 1. Fig. 5 is a top view showing the arrangement of the links. Fig. 6 is a bottom view.

Referring now to the drawings the present gambrel comprises a main vertical member 10, formed of bar metal which is split at its lower end, the resultant portions 11 and 12 being bent outwardly as shown at 13 to form shoulders, and being then bent downwardly to form yoke arms 14.

A pair of gambrel arms 15 are provided and have their inner ends disposed between the yoke arms 14 in overlapping relation, a pin 16 being passed through the overlapping ends and through the yoke arm to pivotally mount the gambrel arms. At their outer ends the gambrel arms have upwardly directed hooks 17 for engagement with the feet of an animal as shown.

A traveler 18 is movable upon the upright 10 above the shoulders 13. This traveler consists of two plates 19 which are disposed against opposite faces of the upright and which extend beyond the edges thereof.

Downwardly curved links 20 are pivoted at their upper ends between the plates 19, one at each side of the upright, and the lower ends of these links are pivoted to the arms
15 between the ends thereof.

The upper end of the member 10 is provided with a hook 11 by means of which it may be suspended.

In use, the feet of an animal are engaged with the hooks 17, when the weight of the animal will move the arms 15 downwardly and therewith the traveler 18 which will be brought into engagement with the shoulders 13 which limit its movement, and prevent the movement of the arms 15 beyond their center of pivotal movement.

The links 20 have their lower ends pivoted upon opposite sides of the arms 15, the links being given a slight bend to offset their lower ends into the proper planes.

What is claimed is:

1. A gambrel comprising an upright member having a bifurcated lower end, the furcations being offset oppositely to form spaced yoke arms and shoulders at the upper ends of the arms, gambrel arms pivoted at their inner ends between the extremities of the yoke arms and in overlapping relation, a traveler comprising plates arranged at opposite sides of and movable upon the upper portion of the upright member, and links pivoted to the ends of the traveler plates and to the gambrel arms at points spaced from the outer ends of said gambrel arms, said shoulders being arranged to receive the traveler plates thereagainst to limit the downward movement thereof.

2. A gambrel comprising an upright member, gambrel arms pivoted to the lower end of the upright member and extending laterally and upwardly, a traveler movable upon the upright, links pivoted to the traveler and to the gambrel arms at points spaced from the outer ends thereof, for hingedly connecting said traveler with said gambrel arms, and means for limiting the downward movement of the traveler to prevent movement of the gambrel arms beyond their center of pivotal movement.

3. In a gambrel comprising an upright member, forked arms formed at the lower end of said upright member, gambrel arms pivoted between the ends of the forked arms and lying in lapped relation, plates arranged at each side of said upright member and for traveling thereon, links having one of their ends pivoted between the ends of said traveling plates, the other ends of said links being pivoted to said gambrel arms upon the contiguous faces thereof, said links being laterally bent to conform to the plane of the contiguous faces of said gambrel arms, and shoulders formed at the juncture of said upright member and said forked arms for limiting the downward movement of said traveling plates.

In testimony whereof I affix my signature, in the presence of two witnesses.

JASPER F. WILSON.

Witnesses:
 OSCAR JOHNSON,
 AMY L. MATHIAS.

Copies of this patent may be obtained for five cents each, by addressing the "Commissioner of Patents, Washington, D. C."